United States Patent [19]
Bekiarian et al.

[11] Patent Number: 4,612,357
[45] Date of Patent: Sep. 16, 1986

[54] MELT-PROCESSIBLE TETRAFLUOROETHYLENE COPOLYMERS AND PROCESS FOR PREPARING THEM

[75] Inventors: Paul G. Bekiarian, Claymont; Paul T. Gilmore, Hockessin, both of Del.

[73] Assignee: E. I. Du Pont de Nemours and Company, Wilmington, Del.

[21] Appl. No.: 753,276

[22] Filed: Jul. 9, 1985

[51] Int. Cl.$^4$ ............................................. C08F 214/16
[52] U.S. Cl. .................................. 526/247; 524/805; 526/249
[58] Field of Search ................. 524/805; 526/247, 249

[56] References Cited

U.S. PATENT DOCUMENTS

| 3,351,619 | 11/1967 | Warnell | 526/249 |
| 4,035,565 | 7/1977 | Apotheker et al. | 526/249 |
| 4,158,678 | 6/1979 | Tatemoto et al. | 260/884 |
| 4,243,770 | 1/1981 | Tatemoto et al. | 525/331 |

FOREIGN PATENT DOCUMENTS 53-125491  11/1978  Japan.

Primary Examiner—Harry Wong, Jr.

[57] ABSTRACT

A thermoplastic, non-thermosettable copolymer of tetrafluoroethylene, an iodoperfluoroalkyl ethylene and an optional selected third comonomer. The copolymer can be extruded at higher rates than heretofore possible.

6 Claims, No Drawings

MELT-PROCESSIBLE TETRAFLUOROETHYLENE COPOLYMERS AND PROCESS FOR PREPARING THEM

FIELD OF THE INVENTION

This invention relates to improved tetrafluoroethylene copolymers that can be melt-processed. The copolymers can be extruded at faster rates than conventional ones. The copolymers also have higher values of melt tension than conventional ones.

BACKGROUND OF THE INVENTION

There are two classes of tetrafluoroethylene polymers, non-melt-processible and melt-processible. The non-melt-processible ones are composed essentially of recurring tetrafluoroethylene units, i.e., they are substantially homopolymers of high molecular weight. They can be processed into shaped articles only by sintering or ram-extrusion, or by paste extrusion, depending on type.

In sharp contrast, melt-processible tetrafluoroethylene polymers can be melted and extruded in ordinary melt-extrusion equipment. They contain comonomer units which permit lowering the melt viscosity of the polymer enough to make the polymer melt-extrudable. Thus they can be molded into extruded articles, injection molded articles, or used as coatings for wire and tubes, and the like. The copolymers tend to undergo melt fracture as extrusion rates, i.e., speeds, increase and this results in rough surfaces of extruded articles. An increase in extrusion rates before onset of melt fracture is a desirable goal for improving these melt-processible polymers. Such an improvement is found in the copolymers of this invention.

SUMMARY OF THE INVENTION

This invention is directed to a melt-processible, nonelastomeric, thermoplastic, non-thermosetting tetrafluoroethylene copolymer resin which contains a very small amount of recurring units derived from at least one iodo(perfluoroalkyl) ($C_1$–$C_{10}$) ethylene. The copolymers can be extruded at faster rates than conventional ones. The copolymers also have higher values of melt tension than conventional ones.

DETAILED DESCRIPTION OF THE INVENTION

The copolymer, in a preferred aspect, will contain
(a) at least 99.97 weight percent recurring units derived from tetrafluoroethylene based on weight of (a) and (b),
(b) sufficient recurring units, but not more than 0.03 weight percent based on (a) and (b), derived from at least one iodo(perfluoroalkyl) ($C_1$–$C_{10}$) ethylene, to produce at least 0.00005 weight percent iodine based on weight of (a) and (b),
(c) between 0.5–20 weight percent, based on weight of (a),(b) and (c), recurring units derived from at least one ethylenically unsaturated comonomer of the formula $R_f$—CF=$CF_2$ or $R_f$OCF=$CF_2$ or mixtures thereof, wherein $R_f$ is perfluoralkyl of 1-10 carbon atoms,
said copolymer having
(i) a melt tension number of at least 331 microgram per Pa.s,
(ii) an $MV_5$ of between $10^2$ and $10^6$ Pa.s.

The iodo(perfluoroalkyl) ethylene is preferably one in which the alkyl group has the formula $-(CF_2)_x-$ where x is a cardinal number of 1-10 inclusive. 4-iodo-3,3,4,4-tetrafluorobutene-1 is preferred. It has the formula ICF$_2$—CF$_2$—CH=CH$_2$. It is sometimes referred to as ITFB. Tetrafluoroethylene has the formula $CF_2$=$CF_2$.

Comonomers of the formula $R_f$CF=$CF_2$ are represented by hexafluoropropylene (HFP) and the like. Comonomers of the formula $R_f$OCF=$CF_2$ are represented by perfluoropropylvinyl ether (PPVE) and the like. The amount of these comonomers present is large enough to render the copolymer melt-processible. Ordinarily, tetrafluoroethylene homopolymer has a melt viscosity so high that it cannot be processed through ordinary molding equipment.

By the term "melt-processible" is meant that the copolymer can be processed (i.e., fabricated into shaped articles such as films, fibers, tubes, wire coatings and the like) by conventional melt extruding means. Such requires that the melt viscosity at the processing temperature, e.g., 320°–400° C., be no more than $10^6$ Pa.s. Preferably it is in the range of $10^2$ to $10^6$ Pa.s and most preferably $10^3$ to $10^5$ Pa.s. Thus, the amount of comonomer present in the melt-processible tetrafluoroethylene copolymers will be an amount sufficient to impart melt-processibility to the copolymer. Generally, for the perfluoro(alkyl vinyl ethers), this amount will be at least 0.5% by weight based on weight of copolymer, and can be up to about 20%. Preferably the amount will be about 2-7% and the alkyl group will be n-$C_3F_7$. Generally, for the perfluoro(terminally unsaturated olefin), the amount will be at least about 10% by weight based on weight of copolymer, and can be up to about 20 or 25%. Preferably the amount will be about 10-15% and the olefin will be $C_3F_6$ (hexafluoropropylene).

The copolymers are nonelastomeric and are partially crystalline. After extrusion, they do not exhibit a rapid retraction to substantially the original length from a stretched condition of 2X at room temperature.

By the term "non-thermosetting" is meant that after heating the copolymer above its melting point for a specified time and cooling to below its melting point, the copolymer is still melt processable. Thus, no chemical cross-linking reactions have occurred in the polymer which result in formation of a polymer network.

The polymers of this invention can be prepared by an aqueous polymerization procedure. In this procedure, a stainless steel autoclave is charged with a demineralized water, and a surfactant, such as ammonium perfluorooctanoate (C-8). Iodo-perfluoroalkyl ethylene is added with an initiator, such as ammonium persulfate (APS) or potassium persulfate (KPS). The iodo monomer can be added continuously, in a precharge, or can be added in a partial precharge plus continuously. The autoclave is then pressurized with TFE and comonomer at 50°–120° C. at pressures of 0.69–5.5 MPa gauge and the polymerization begins under agitation. Polymer produced is mechanically coagulated and collected. A general procedure is set forth in Khan et al., U.S. Pat. No. 4,380,618.

The copolymers of this invention exhibit a 2- to 3-fold increase in extrusion rates before the onset of melt fracture and have a higher melt tension at a given melt viscosity than polymers identically constituted except that they do not contain any iodo-perfluoroalkyl ethylene. It is theorized that the increase in extrusion rate and the higher melt tension is caused by the action of the iodo-perfluoroalkyl ethylene creating a chain branching site when this monomer enters the chain, as per the following equation:

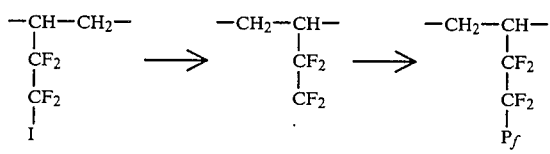

wherein $P_f$ is the newly formed polymer chain.

The carbon-iodine bond is selectively weak, and it cleaves, leaving a radical site available for radical attack by another monomer unit or by a perfluorinated hydrocarbon radical.

Thus a copolymer is obtained in which carbon chains are believed to be formed which have long chain branches. It is understood that the amount of the iodo monomer is kept small so that this chain branching occurs rather than crosslinking of carbon chains. A crosslinked polymer is of course intractible and incapable of being melt-processed. Chain or branch growth terminates by terminating radical formation as, for example, by bond formation from two polymer chain radicals.

The copolymers of this invention are useful in high speed extrusion applications such as wire cable coating, film extrusions and the like. In addition, the copolymer can be used to make foamed articles of small cell size foam by mixing with foaming agents as described for example in U.S. Pat. No. 3,072,583 and extruding the mixture.

TEST PROCEDURES

1. $MV_5$ (melt viscosity after 5 minutes residence time)

The $MV_5$ of the copolymers is a melt viscosity measured according to ASTM D-1238-82 modified by (1) using a cylinder, orifice and piston tip made of a corrosion-resistant alloy, such as Haynes Stellite 19, (2) charging a 5.0 g sample to the 9.53 mm inside diameter cylinder which is maintained at 372° C. + or −1° C., (3) extruding the sample 5 minutes after charging, through a 2.10 mm diameter, 8.00 mm long square-edged orifice under a load (piston plus weight) of 5000 g (this corresponds to a shear stress of $4.5 \times 10^4$ Pa). The $MV_5$ in Pa.s is calculated as 5315 divided by the observable extrusion rate in grams per minute.

2. Polymer Composition a. $R_fCF=CF_2$ Content. (as represented by hexafluoropropylene (HFP))

The HFP content is determined by measurement of the ratio of the IR abosrbance at 10.18 micrometers and the absorbance at 4.23 micrometers. This ratio is referred to as the HFP index, or the HFPI. The IR measurements were made using a Miran Model 80 infrared spectrophotometer. The scans were run at slow speed under a nitrogen atmosphere. Approximately 0.05 mm thick compression molded films were used for the measurements. However, for TFE/HFP/PPVE terpolymers (PPVE=perfluoropropyl vinyl ether), the PPVE band at 10.05 micrometers overlaps the HFP band at 10.18 micrometers. Thus, the HFPI for these terpolymers is corrected for the contribution from the PPVE band. The amount of PPVE in the terpolymer was determined by a different procedure, which is described below. A correction to the HFPI determination was found to be 0.25 times the weight percent of PPVE in the terpolymer. This formula for correcting the HFPI is shown below:

$$HFPI\ (Corrected) = HFPI\ (measured) - 0.25 \times wt\ \%\ PPVE.$$

The relationship between the HFPI and HFP content is as follows:

wt % $HFP = 3.2 \times HFPI$.

b. $R_f\text{-}O\text{-}CF=CF_2$ Content (as represented by Perfluoropropyl vinyl ether (PPVE))

The weight percent PPVE content is determined by measurement of the ratio of the IR absorbance at 10.05 micrometers and the absorbance at 4.23 micrometers. The IR measurements were made using a Perkin Elmer 283B Infrared Spectrophotometer. Scans were run at slow speed under a nitrogen atmosphere, approximately 0.05 mm thick compression molded films were used for the measurements. The PPVE content of TFE/HFP/PPVE terpolymers is determined from the measurement of the absorbance band at 7.46 micrometers. A 0.1 to 0.15 mm thick film of the sample is pressed at 350° C. A TFE/HFP copolymer film of the same thickness (to within 0.005 to 0.008 mm) is also pressed. Each film is scanned through the absorbance band at 4.23 micrometers. If the films differ by more than 0.03 absorbance units, more closely matched films are prepared. When a match is obtained at 4.23 micrometers, the absorbance of the terpolymer film at 7.46 micrometers, compensated by the TFE/HFP copolymer film, is determined. Due to the large amount of compensating absorbance in the reference beam, the pen response will be slow. The scan is stopped at the band maximum and checked to see that pen response is adequate for the scan speed being used. If not, the instrument parameters are readjusted and the spectrum rerun. Since total adsorption occurs just beyond the maximum, the base line is taken by extrapolation from the high-frequency side of the band. The method is calibrated using the TFE/PPVE copolymer film of known PPVE content. The relationship between absorbance at 7.46 micrometers and PPVE content is as follows:

wt. % $PPVE = 1.25 \times$ (absorbance at 7.46 micrometers) divided by film thickness in mm.

c. Iodine Content

Iodine content can be determined by placing 50 gm of polymer in a solution containing 10 ml "FREON" 113, 15 ml glacial acetic acid, and 0.1 g KI. The KI forms an $I_3^-$ complex with the extracted $I_2$. The absorbance at 485 nm is measured and compared with prepared standards. The iodine content of the polymer can then be calculated.

3. Melt Tension

Melt tension is the force required to uniaxially draw a molten polymer strand as it extrudes from a piston rheometer.

A sample of polymer (15 g) is charged to the barrel of a piston rheometer maintained at 370° C.±1° C. It is extruded at a constant rate of 0.1086 cm$^3$/min through a capillary die with a bore of 1.905 mm and a length of 38 mm. Under these conditions the shear rate experienced by the polymer is 2.66 s$^{-1}$. The molten extrudate is drawn by a pair of take-up wheels at the constant rate of 1.524 m/min through a 2.54 cm diameter pulley attached to a transducer. The distance from the rheometer exit to the transducer pulley is 25.4 cm. The melt tension is the measured force in grams at the transducer. The measurement is recorded at the point the observed shear stress reaches a constant value. Two parameters are measured: (a) melt tension in grams (MT), (b) melt viscosity in Pa.s at the specified shear rate of 2.66 s$^{-1}$.

The melt tension specification is based on the relationship between the two simultaneously measured parameters: MT and the corresponding MV@2.66 s$^{-1}$. A linear relationship between Log$_{10}$ (MT) and Log$_{10}$ (MV@2.66 s$^{-1}$) is established for conventional fluoropolymers. This linear relationship is described by the equation:

$$\log_{10}(MT) = 1.002 \log_{10}(MV@2.66\ s^{-1}) - 3.568$$

and defines the calibration of the instrument. Statistical analysis has allowed the calculation of a 99% confidence interval which defines the maximum spread of data for conventional polymers about the above calibration line. Polymers which fall within the confidence interval have melt tension values expected for conventional polymers. The upper limit of the confidence interval is described by the equation:

$$MT = 3.3113 \times 10^{-4} \times (MV@2.66\ s^{-1}).$$

Polymers which fall above the upper limit of the confidence interval, satisfying the relationship:

$$MT > 3.3113 \times 10^{-4} \times (MV@2.66\ s^{-1})$$

have higher values of melt tension than conventional ones and are thereby distinct from conventional polymers.

Melt tension number (MTN) of a polymer is defined by:

$$MTN = (MT)/(MV@2.66\ s^{-1})$$

Polymers which fall above the upper limit of the confidence interval will have the following attribute:

$$MTN > \frac{331\ \text{microgram}}{Pa \cdot s}$$

EXAMPLES

EXAMPLE 1

Preparation of ITFB Modified TFE/HFP

A 37.8 l polykettle was charged with 18.1 kg demineralized water, 30 g ammonium perfluorooctanoate (C-8) and 5 g potassium persulfate (KPS). The temperature was raised to 100° C. for 10 minutes; the contents were discharged and the polykettle was rinsed with 9.1 kg additional demineralized water.

The polykettle was charged with 24.5 kg filtered demineralized water and 23 g C-8 and pressure tested at 95° C. and 4.1 MPa nitrogen pressure. The temperature was reduced to 65° C., the polykettle was evacuated then purged with TFE and evacuated. 60 ml of a solution of ITFB, 4-iodo-3,3,4,4-tetrafluorobutene-1, in "Freon"-113, 1,1,2-trichloro-trifluoroethane, solvent was added to the polykettle. The temperature was raised to 95° C. and agitation at 38 rpm begun. The polykettle was pressurized to 2.8 MPa with HFP then to 4.1 MPa with TFE. 600 ml Initiator solution A (APS in water) was pumped in at a rate of 50 ml/min. Initiator solution B (KPS in water) was then fed at a rate of 10 ml/min along with a solution of ITFB in "Freon"-113 at a rate of 2.0 ml/min (See Table I). TFE was fed to the polykettle to maintain a pressure of 4.1 MPa at the specified feed rate of 50 g/min by adjusting the agitator speed within the specified limits of 25-55 rpm. When the total TFE charge reached 7.9 kg, feeding of TFE was discontinued and the reaction mixture cooled to ambient temperature. The polykettle was vented, the polymer dispersion was discharged and mechanically coagulated. The dewatered flake was subsequently heat-treated at 370° C. for 3 hr. Properties are shown in Table II.

Similarly prepared copolymers exhibited iodine evolution of over 0.00005 weight percent.

TABLE I

| BATCH NUMBER | ITFB in "Freon" 113 (g/l) | TOTAL ITFB SOLUTION FED (ml) | INITIATOR A APS IN WATER (g/l) | INITIATOR B KPS IN WATER (g/l) | TOTAL ITFB CHARGED WT % |
|---|---|---|---|---|---|
| I-1 | 6.36 | 380 | 4.0 | 20.0 | 0.03 |
| I-2 | 3.18 | 380 | 4.0 | 15.0 | 0.015 |

TABLE II

| BATCH NUMBER | MV @ 2.66 s$^{-1}$ (Pa · s × 10$^{-3}$) | MELT TENSION (g) | MELT TENSION NUMBER μg/Pa · s | HFPI | MV5, Pa · s × 10$^{-3}$ |
|---|---|---|---|---|---|
| I-1 | 6.73 | 2.9 | 430 | 3.94 | 9.2 |
| I-2 | 3.96 | 1.4 | 350 | 3.78 | 9.0 |
| Comparison resin* | 6.65 | 1.8 | 270 | 3.8 to 4 | 7.5-8.5 |

*a commercial resin for comparison that contains about 89 weight percent tetrafluorethylene units and about 11 weight percent hexafluoropropylene units.

EXAMPLE 2

Preparation of ITFB Modified TFE/PPVE Resin

A 37.8 l polykettle was charged with 18.1 kg demineralized water, 30 g ammonium perfluorooctanoate (C-8) and 5 g ammonium persulfate (APS). The temperature was raised to 100° C. for 30 minutes; the contents were discharged and the polykettle was rinsed with 9.1 kg additional demineralized water.

The polykettle was charged with 26.1 kg filtered demineralized water, 32 g C-8 and 29.5 g ammonium carbonate. The temperature was reduced to the temperature of the cooling water. The polykettle was evacuated/purged with TFE three times and finally evacuated. Ethane was admitted to the system until a specified rise in pressure was obtained. 350 ml "Freon" 113 and 135 ml of a solution of ITFB in PPVE was added to the polykettle. The temperature was raised to 80° C. and agitation at 50 rpm was begun. The pressure inside the polykettle was raised to 2.1 MPa gauge by adding TFE. 500 ml of Initiator solution A was pumped in at a rate of 50 ml/min. Then Initiator solution B (APS in water) was fed at a rate of 10 ml/min along with the solution of ITFB in PPVE at a feed rate of 1 ml/min. TFE was fed to the polykettle to maintain a pressure of 2.1 MPa gauge at a specified feed rate of 49 g/min by adjusting the agitator speed (See Table III). When the total TFE charge reached 6.8 kg, feeding of TFE and the PPVE solution was discontinued and agitation was stopped. The reaction mixture was cooled to ambient temperature and the polykettle was vented and flushed with nitrogen. The polymer dispersion was discharged and mechanically coagulated. The dewatered flake was subsequently heat-treated at 250°–370° C. for 3 hr. Properties are given in Table IV.

Iodine content of similarly prepared copolymers was over 0.00005 weight %.

son was used as a control. The physical and electrical properties of the coated wire were then evaluated and found to be satisfactory. The results on extrusion rates are shown in Table V. The faster extrusion rates of resins of this invention (I-1 and I-2) over the commercial resin are evident.

TABLE V

| Example | wt % ITFB | HFPI | $MV^5$ Pa·s × $10^{-3}$ | Maximum Extrusion Rate onto AWG #12 Wire, m/min | MELT TENSION NUMBER µg/Pa·s |
|---|---|---|---|---|---|
| I-1 | 0.030 | 3.78 | 9.2 | 33.5 | 430 |
| I-2 | 0.015 | 3.94 | 9.0 | 24.4 | 350 |
| Comparison Resin | 0.0 | 3.80 | 7.5–8.5 | 10.7 | 270 |

We claim:

1. A melt-processible, nonelastomeric, thermoplastic non-thermosetting tetrafluoroethylene copolymer resin polymerized from the unsaturated monomers recited below through polymerization of the double bonds, which contains
   (a) at least 99.97 weight percent recurring units of tetrafluoroethylene based on weight of (a) and (b),
   (b) sufficient recurring units, but not more than 0.03 weight percent based on (a) and (b), of at least one iodo(perfluoroalkyl) ($C_1$–$C_{10}$) ethylene of the formula I($CF_2$)xCH=$CH_2$ where x is a cardinal number of 1–10, to produce at least 0.00005 weight percent iodine, based on weight of (a) and (b),
   (c) between 0.5–20 weight percent based on weight of (a), (b) and (c), recurring units of at least one ethylenically unsaturated comonomer of the formula $R_fCF$=$CF_2$ or $R_fOCF$=$CF_2$ or mixtures thereof wherein $R_f$ is perfluoroalkyl of 1–10 carbon atoms,
   said copolymer having
   (i) a melt tension number of at least 331 micrograms per Pa s,

TABLE III

| BATCH | INITIATOR A APS IN WATER g/l | INITIATOR B APS IN WATER g/l | ETHANE PRESSURE (KPa) | TOTAL ITFB CHARGED wt % | TOTAL ITFB SOLUTION FED (ml) | ITFB IN PPVE (g/l) |
|---|---|---|---|---|---|---|
| II-1 | 3.0 | 2.0 | 23.7 | 0.03 | 275 | 7.58 |
| II-2 | 3.0 | 2.0 | 33.9 | 0.03 | 275 | 7.58 |
| II-3 | 3.0 | 2.0 | 50.8 | 0.03 | 275 | 7.58 |
| II-4 | 6.0 | 4.0 | 16.9 | 0.03 | 275 | 7.58 |

TABLE IV

| BATCH | MV @ 2.66 $s^{-1}$ Pa·s × $10^{-3}$ | MELT TENSION g | MELT TENSION NUMBER µg/Pa·s | PPVE CONTENT Wt. % | $MV_5$, Pa·s × $10^{-3}$ |
|---|---|---|---|---|---|
| II-1 | 7.97 | 3.3 | 410 | 3.52 | 3.68 |
| II-2 | 6.51 | 2.95 | 450 | 3.58 | 2.25 |
| II-3 | 9.07 | 3.5 | 390 | 2.46 | 2.91 |
| II-4 | 6.58 | 3.2 | 490 | 3.42 | 2.45 |
| (Comparison Resin TFE/PPVE resin) | 5.41 | 1.6 | 290 | 2.3 | 7.5–10.5 |

EXAMPLE 3

Extrusion Performance of TFE/HFP/ITFB

Resins were extruded onto AWG #12 wire at the maximum line speed before the onset of melt fracture. The commercial resin used in Example 1 for compari- (ii) an $MV^5$ of between $10^2$ and $10^6$ Pa s at the processing temperature of the copolymer.

2. The copolymer of claim 1 wherein component (b) is 4-iodo-3,3,4,4-tetrafluorobutene-1.

3. The copolymer of claim 2 wherein component (c) is $CF_3\text{-}CF=CF_2$.

4. The copolymer of claim 2 wherein component (c) is $CF_3CF_2CF_2\text{-}O\text{-}CF=CF_2$.

5. A process for preparing a copolymer defined in claim 1 which comprises reacting the tetrafluoroethylene, iodoperfluoroalkyl ethylene and at least one third comonomer (component (c)), in the presence of an initiator and a surfactant in aqueous medium at a temperature of betweeen 30° and 120° C. and at a pressure of between 0.69 and 5.5 MPa gauge.

6. The process of claim 5 wherein the resulting dispersion is treated to coagulate the copolymer formed.

* * * * *